Figure 1:
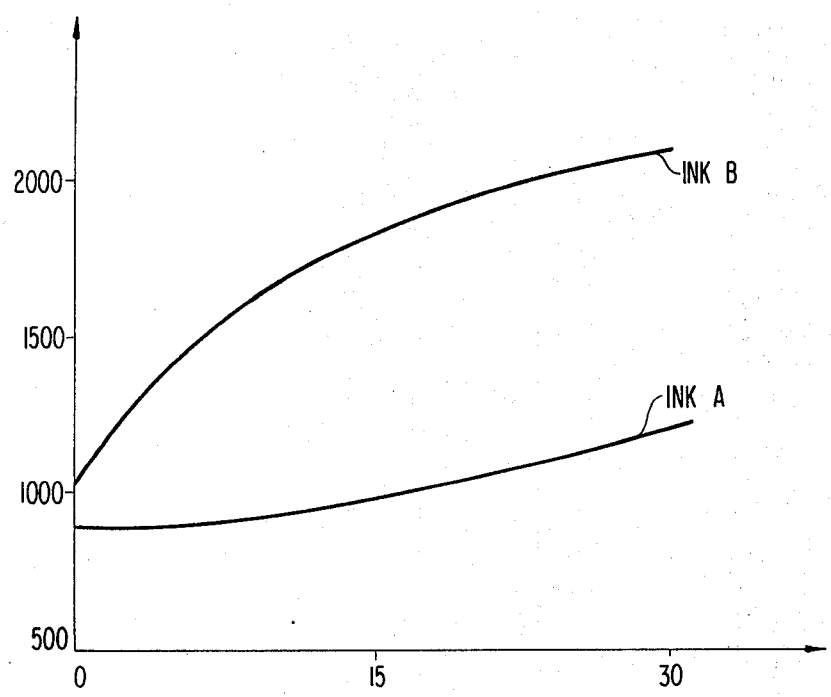

United States Patent [19]

Cabut et al.

[11] 3,985,570
[45] Oct. 12, 1976

[54] STABLE PHTHALOCYANINE PIGMENTS

[75] Inventors: Louis Antoine Cabut, Nogent sur Oise; Jean-Claude Henri Raoul Hardouin, Chantilly; Michel Ernest Antoine Huille, Creil; Daniel Francois Xavier Pigasse, Chantilly, all of France

[73] Assignee: Produits Chimiques Ugine Kuhlmann, Paris, France

[22] Filed: July 15, 1975

[21] Appl. No.: 596,136

[30] Foreign Application Priority Data
July 19, 1974 France .............................. 74.25132

[52] U.S. Cl............................ 106/288 Q; 106/309; 260/314.5
[51] Int. Cl.² ........................................ C04B 31/00
[58] Field of Search........................ 106/288 Q, 309; 260/314.5

[56] References Cited
UNITED STATES PATENTS

| | | | |
|---|---|---|---|
| 3,296,008 | 1/1967 | Pugin .............................. | 106/288 Q |
| 3,536,502 | 10/1970 | Von et al. ...................... | 106/288 Q |
| 3,764,361 | 10/1973 | Kienzle et al. ................. | 106/288 Q |
| 3,767,442 | 10/1973 | Kienzle et al. ................. | 106/288 Q |

Primary Examiner—Patrick P. Garvin
Assistant Examiner—John P. Sheehan
Attorney, Agent, or Firm—Beveridge, DeGrandi, Kline & Lunsford

[57] ABSTRACT

The preparation of pigment compositions with a copper phthalocyanine base, stable to crystallization is described.

There is incorporated in the copper phthalocyanine pigments to be stabilized a compound of the general formula:

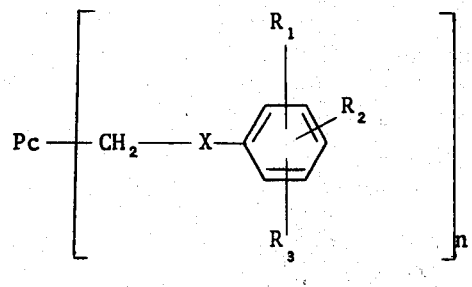

wherein Pc represents a phthalocyanine residue, moiety or radical, X represents oxygen or sulfur or —NH— bridge, $R_1$ represents halogen or alkoxy, trifluoromethyl, trifluoromethoxy, cyano, carboxy, nitro, N-alkylamino or N,N-dialkylamino, $R_2$ represents hydrogen, or alkyl or alkoxy group, $R_3$ represents hydrogen or alkyl, $n$ is a number from 1 to 8, $R_1$, $R_2$ and $R_3$ may occupy the ortho, meta or para positions of the benzene ring.

The pigment compositions according to the invention are particularly well suited for the coloring of printed inks.

6 Claims, 5 Drawing Figures

STABLE PHTHALOCYANINE PIGMENTS

This invention relates to the preparation of pigment compositions with a copper phthalocyanine base, which pigments are crystallization stable. The compositions of the invention are particularly well suited for the coloring of solvent base printing inks. It has been determined that the rheological properties, in particular viscosity, of the inks pigmented with the compositions of this invention remain stable with time.

It is known that copper phthalocyanine pigments can be obtained in several crystalline forms. The forms designated by the terms alpha, gamma, delta, epsilon are metastable and present the drawback of being crystallizable. In the presence of solvents and more particularly aromatic organic solvents, they have a tendency to return to the stable beta form, which is accompanied by a change of shade, an increase of the thickness of the particles and a very considerable reduction of the coloring power.

This phenomenon is a definite problem for workers in various fields of technology including paints, plastics and especially in solvent base printing inks where the phenomenon is accompanied by a considerable and undesirable modification of the rheological properties of the ink.

One suggested way to avoid such a polymorphic tranformation resides in using the pigment in the stable beta form. However, this proposal does not completely solve the problem of the stability of the pigment. Although transformation of the crystalline form does not occur during exposure of the pigment in the beta phase to heat or crystallization promoting solvents, the pigment particles have a tendency to undergo a growth of crystals with a resulting loss of coloring power and an undesirable modification of properties. Also, the viscosity of the media into which the pigments are incorporated is undesirably increased.

To avoid this problem, it has been proposed to stabilize the copper phthalocyanine in the alpha phase by introduction of chlorine in the molecule, preferably in position 4 (See U.S. Pat. Nos. 2,933,505 and 3,024,247). However, this process presents the drawback of causing a considerable greening of the shade of the pigments; moreover, its effectiveness is not always satisfactory, particularly when rheological modifications of the printing inks are to be avoided.

More recently, it has been conceived of incorporating into the pigment to be stabilized certain stabilizing compounds derived from chloromethyl phthalocyanine (See French Pat. Nos. 2,114,243; 2,114,244 and 2,114,245 and their first additions 73 18 490; 73 18 491 and 73 18 492 respectively). These processes bring about an appreciable improvement of the stability of the pigment compositions in regard to aromatic solvents; however, the viscosity of the application media, in particular printing inks, continues to undergo considerable modifications with time.

An advantageous way has now been found by Applicants of stabilizing pigments by incorporating into the copper phthalocyanine pigments to be stabilized a compound of the general formula:

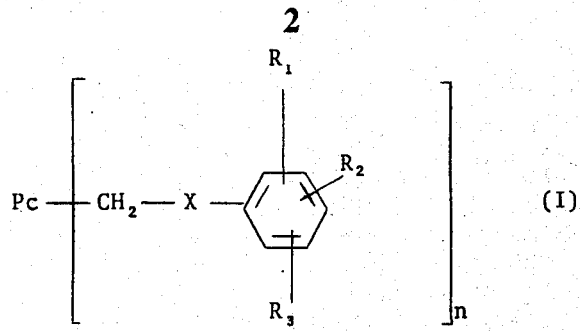

wherein Pc represents a phthalocyanine radical group or moiety, X represents oxygen or sulfur or —NH— bridge, $R_1$ represents halogen (Cl, Br, F or I) or alkoxy, trifluoromethyl, trifluoromethoxy, cyano, carboxy, nitro, N-alkylamino or N,N-dialkylamino, $R_2$ represents hydrogen or alkyl or alkoxy, $R_3$ represents hydrogen or alkyl, $n$ is a number from 1 to 8, preferably 2 or 3, and $R_1$, $R_2$ and $R_3$ can occupy the ortho, meta or para positions of the benzene ring.

The phthalocyanine of the Pc residue can be metallized or not. As metallized phthalocyanine there can be mentioned copper phthalocyanine in the alpha or beta form.

All alkyl or alkoxy groups referred to above preferably contain from 1 to 4 carbon atoms.

The copper phthalocyanine pigments to be stabilized can be in the crystalline forms of alpha, beta, gamma, delta, epsilon (form also designated by the letters R or X).

As examples of the compounds of formula (I) there can be cited tris-(2-methoxy anilinomethyl) cuprophthalocyanine, tris-(2-chloroanilinomethyl) cuprophthalocyanine, tris-(4-butoxy anilinomethyl) cuprophthalocyanine, bis-(3-trifluoromethyl anilinomethyl) cuprophthalocyanine, bis-(4-trifluoromethoxy anilinomethyl) cuprophthalocyanine, tris-(3,5-dimethoxy anilinomethyl) cuprophthalocyanine, tris-(4-methoxy phenoxymethyl) cuprophthalocyanine, tris-(2-methoxy phenoxymethyl) cuprophthalocyanine, bis-(3,5-dimethoxy phenoxymethyl) cuprophthalocyanine, tris-(2-chlorophenoxymethyl) cuprophthalocyanine, bis-(3-trifluoromethyl phenoxymethyl) cuprophthalocyanine, tris-(3-cyano phenoxymethyl) cuprophthalocyanine, tris-(4-carboxy phenoxymethyl) cuprophthalocyanine, bis-(4-nitro phenoxymethyl) cuprophthalocyanine, tris-(4-methoxy phenylthiomethyl) cuprophthalocyanine, tris-(4-nitro phenylthiomethyl) cuprophthalocyanine, bis-(N,N-3-dimethylamino phenoxymethyl) cuprophthalocyanine, bis-(N,N-3-diethylamino 4-methyl phenoxymethyl) cuprophthalocyanine.

The compounds of formula (I) can be obtained by causing a halogenomethyl phthalocyanine to react with a compound of the formula:

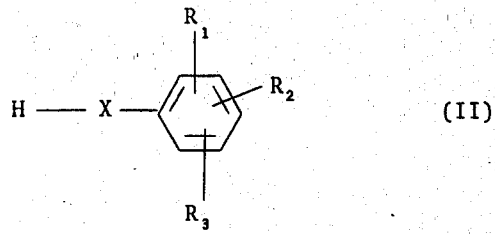

R₁, R₂, R₃ and X being as defined above, according to known processes in the art (See French Pat. No. 924,363; British Pat. No. 587,636).

Incorporation of the stabilizing phthalocyanines of formula (I) into the copper phthalocyanine pigments to be stabilized can be done by simple mixing, in aqueous or organic diluent suspension, at ambient temperature or hot, at elevated temperatures, followed by a filtering and draining.

It is also possible to dry grind the copper phthalocyanine to be stabilized and the stabilizing phthalocyanine, in the presence of a water-soluble salt, then take up the mixture with hot water to eliminate the salt, filter and dry.

Further, it is also possible to malax the pigment to be stabilized in the form of press paste, with the stabilizing phthalocyanine. A particularly advantageous technique consists of grinding the raw copper phthalocyanine with the stabilizer dry, in the absence of the grinding adjuvant, then in treating this mixture with a solvent until it acquires the pigment character.

In making the pigment compositions of this invention, there is incorporated 1 to 20%, preferably 2 to 10%, of the compound of formula (I).

The pigment compositions according to the invention with a base of a copper phthalocyanine pigment in one of the crystalline forms mentioned above with a compound of formula (I) do not crystallize and do not change form upon contact with aromatic organic solvents even when hot. Further, the viscosity of the solvent base pigment composition, in particular that of printing inks, when modified by pigment compositions of the invention, does not undergo considerable variations during extended storage. They also have the advantage of having good resistance to bleeding, which could not be anticipated because of the solubility of the compounds of formula (I) in aromatic solvents such as xylene or toluene. Further, they are fast to overspray; which property is verified by the absence of migration of pigments in a white paint covering an area colored with a phthalocyanine base paint.

The following examples, in which the parts and percentages are expressed by weight, illustrate the invention without limiting it.

EXAMPLE 1

40 parts of copper phthalocyanine (C.I. 74 160) (beta form) are dissolved in 80 parts of sulfuric chlorohydrin and 70 parts of 100% sulfuric acid. 50 parts of paraformaldehyde are added and the mixture is heated for 3 hours at 70°–75° C then heated for 2 hours at 90° C. It is allowed to cool to ambient temperature and poured into a mixture of water and ice. The precipitate thus formed is filtered, washed until neutral and dried at 40°–50° C. A product is obtained whose chlorine content is 10.5% and corresponds to dichloromethyl copper phthalocyanine.

Into 50 parts of guaiacol are introduced 2.8parts of sodium hydroxide and the mixture is heated to complete dissolution. There are then added with stirring 14 parts of bis-(chloromethyl) copper phthalocyanine and this is heated at 120°–125° C for about 20 hours. After the mixture is allowed to cool to 80° C, the reaction product is precipitated by addition of alcohol. It is filtered, washed with alcohol, then water to neutrality and dried. Thus, there are obtained in the form of a blue powder 16 parts of a product whose composition corresponds approximately to that of bis-(2-methoxy phenoxymethyl) cuprophthalocyanine.

| Analysis | C% | H% | N% | Cu% |
|---|---|---|---|---|
| Calculated for $C_{48}H_{32}N_8O_4Cu$ | 67.96 | 3.77 | 13.21 | 7.49 |
| Found | 67.13 | 3.50 | 14.00 | 8.00 |

By replacing the guaiacol with parabutoxy phenol, chlorophenols or 3-trifluoromethyl phenol, there are obtained according to the procedures of Example 1 respectively bis-(4-butoxy phenoxymethyl) copper phthalocyanine, bis-(chlorophenoxy methyl) copper phthalocyanine, bis-(3-trifluoromethyl phenoxy methyl) copper phthalocyanine.

EXAMPLE 2

Into 100 parts of ortho-anisidine are introduced 14 parts of bis-(chloromethyl) copper phthalocyanine. It is heated at 95°–100° C with stirring until a sample is obtained which, when diluted with alcohol, filtered and washed with water, no longer contains chlorine. After 15 hours of heating the reaction is practically finished. It is poured into a mixture comprising 100 parts of concentrated hydrochloric acid and 300 parts of water, filtered, washed with water to neutrality and dried.

There are obtained 17 parts of a chlorine-free blue product. Elementary analysis made on this product corresponds to that of bis-(2-methoxy anilinomethyl) copper phthalocyanine.

| Analysis | C% | H% | N% | Cu% |
|---|---|---|---|---|
| Calculated for $C_{48}H_{34}N_{10}O_2Cu$ | 68.28 | 4.03 | 16.59 | 7.58 |
| Found | 67.99 | 3.98 | 16.16 | 7.19 |

When the ortho-anisidine is replaced by parabutoxyaniline, 3-trifluoromethyl aniline or para-trifluoromethoxyaniline, there are obtained according to this procedure, respectively bis-(4-butoxy anilinomethyl) copper phthalocyanine, bis-(3-trifluoromethyl anilinomethyl) copper phthalocyanine, bis-(4-trifluoromethoxy anilinomethyl) copper phthalocyanine.

EXAMPLE 3

In a container placed in a shaking apparatus, there are thoroughly mixed for about 10 hours 95 parts of a copper phthalocyanine pigment in alpha form with 5 parts of bis-(3-trifluoromethyl phenoxymethyl) copper phthalocyanine. This mixture obtained is very stable in solvents.

The stability to recrystallization is verified in the following way:

1 g of pigment mixture is put in suspension in 100 ml of xylene; it is heated for 2 hours with reflux, cooled, filtered and washed with acetone. This mixture, treated with xylene, is incorporated in a paint. In relation to an untreated pigment it does not present any variation of shade or yield.

If the same test is applied to a copper phthalocyanine pigment in alpha form, in the pure state, free of the (3-trifluoromethyl phenoxymethyl) phthalocyanine, it completely recrystallizes in boiling xylene, in the form of thick needles of the beta variety. When incorporated in a paint and applied in comparison with the pigment not treated with xylene, it presents a clearly inferior yield.;

EXAMPLE 4

By means of a binder for photogravure containing 47% calcium resinate, 45% toluene and 8% formophenolic (phenolformaldehyde) resin, there are prepared by grinding for 45 minutes in a ball mill of the attritor type, two inks containing respectively: Ink A: 10% of the pigment composition according to Example 3 above; Ink B: 10% of pigment stabilized by 5% of tris-(2,3,5-trimethyl phenoxymethyl) copper phthalocyanine (See Example 2 of French Pat. No. 2,411,243).

These inks are stored at 25° C and the variation of their viscosity is measured as a function of time.

Figure 2:
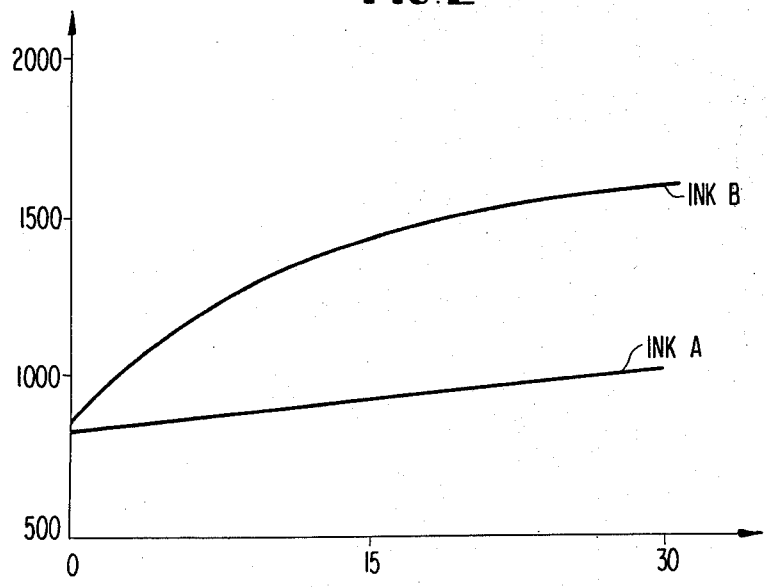

In the drawings FIGS. 1 and 2 show the variations of viscosity of inks A and B during this ageing test. The length of storage in days is represented on the abscissa and the viscosity is expressed in centipoises on the ordinate. Measurements were made respectively at 50 rpm (FIG. 1) and 100 rpm (FIG. 2) with the mobile part No. 3 of a Brookfield viscosimeter.

Examination of the curves shows that ink A presents a stability in storing clearly superior to that of ink B. Further, application of ink A aged in comparison with ink A freshly prepared from the same pigment composition, shows that there as been no evolution of the coloring power in time.

These properties are very interesting, since the storing stability is an essential quality of printing inks.

EXAMPLE 5

There are thoroughly malaxed 100 parts of press paste of copper phthalocyanine of the beta variety containing 25 parts of dry pigment with 1 part of bis-(2-methoxy anilinomethyl) copper phthalocyanine. The mixture is dried then reduced to fine powder.

The composition obtained is stable to crystalline growth. The solvent base printing inks, prepared from this pigment composition, present rheological properties, in particular viscosities, which practically do not vary during extended storing; verification is performed as in the example above. Ink C: 90% of binder and 10% of the above pigment composition; Ink D: 90% of binder and 10% of pigment stabilized by 5% of tris-(2,6-dimethyl anilinomethyl) copper phthalocyanine (See Example 3 of French Pat. No. 2,114,245). Ink E: 90% of binder and 10% of phthalocyanine pigment free of stabilizer.

Figure 3:
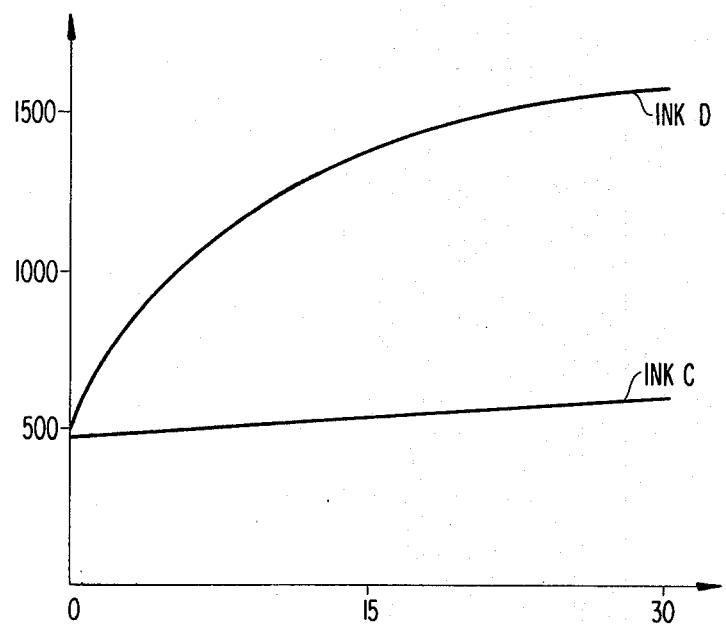
Figure 4:
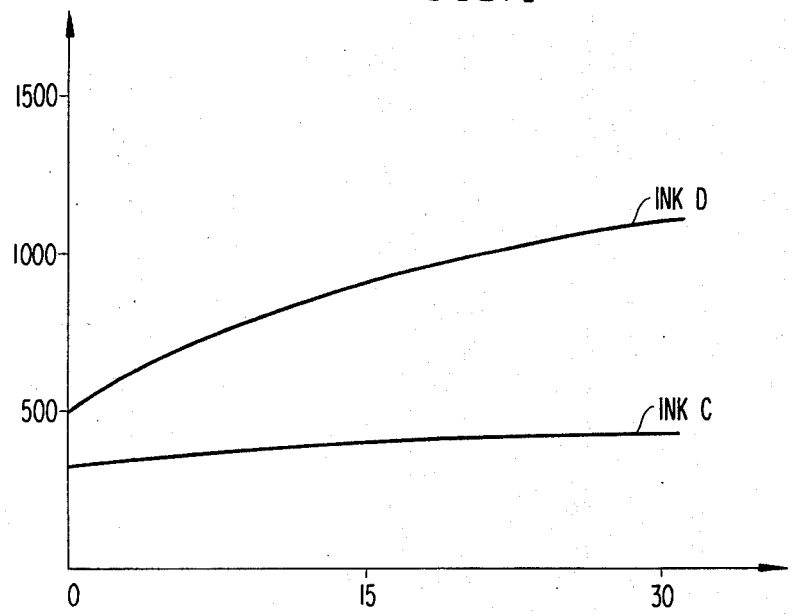

FIGS. 3 and 4 show the variations of viscosity of inks C and D as a function of the storing period expressed in days; the viscosity of ink E rapidly becomes higher and the variation of viscosity could not be followed by this method.

Examination of the curves shows that the storing stability of ink C is clearly superior to that of ink D.

EXAMPLE 6

When the preceding example, the bis-(2-methoxy anilinomethyl) copper phthalocyanine is replaced by bis-(4-trifluoromethoxy anilinomethyl) copper phthalocyanine, a pigment composition is also obtained which does not crystallize upon contact with aromatic solvents and makes possible the preparation of inks for photogravure that are stable during storing.

EXAMPLE 7

Raw copper phthalocyanine in beta form is ground in a ball mill, until there is obtained a mixed crystalline form corresponding to 75% of alpha form and 25% of beta form and not having pigment power.

In 1000 parts of pyridine there are introduced 4 parts of bis-(2-methoxy phenoxymethyl) cuprophthalocyanine, then 96 parts of the ground phthalocyanine obtained above. The mixture is brought to 80° C and kept at this temperature for an hour with stirring. The mixture is diluted by addition of 1000 parts of water at 60° C, filtered, washed with water to eliminate the pyridine and dried. There is obtained a pigment composition entirely in beta form, crystallization stable and with a high color yield. This composition is suitable for any pigment application.

Figure 5:
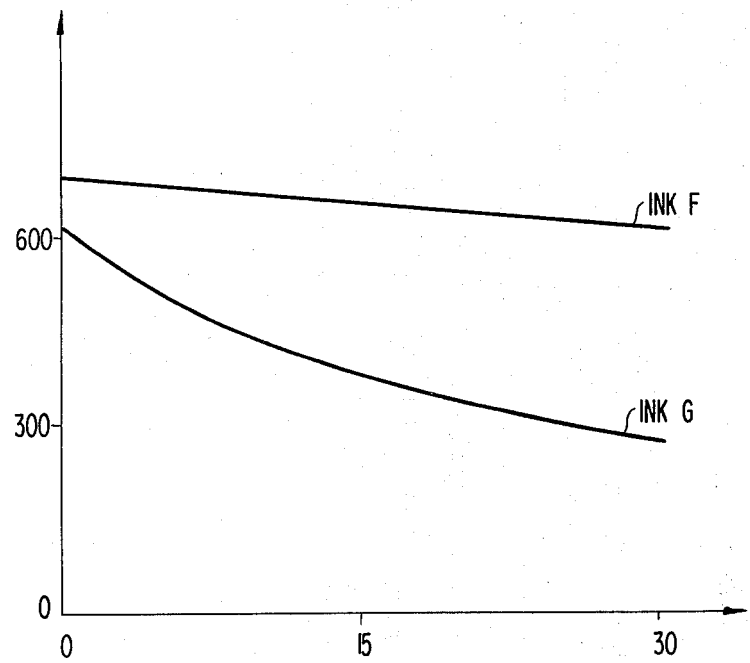

FIG. 5 represents the variations of viscosity of an ink (F) with a nitrocellulose base containing 10% of the above pigment composition in comparison with an ink (G) containing 10% of a beta form phthalocyanine pigment, stabilized by 6% of tris-(2,3,5-trimethyl phenoxymethyl) coppper phthalocyanine (See Example 2 of French Pat. No. 2,114,243). Measurements were made on a Brookfield viscosimeter at 100 rpm with mobile part No. 3.

Examination of the curves shows that ink F presents a stability clearly superior to that of ink G.

EXAMPLE 8

When in the preceding example, the bis-(2-methoxy phenoxymethyl) copper phthalocyanine is replaced by the same amount of bis-(4-nitro phenoxymethyl) nickel phthalocyanine, there is also obtained a beta form pigment which has no tendency to crystallize upon contact with aromatic solvents and makes possible the preparation of printing inks whose rheological properties remain stable with time.

EXAMPLE 9

In a ball mill there are ground 240 parts of chlorine-free raw copper phthalocyanine, with 10 parts of tris-(4-methoxy phenylthio methyl) unmetallized phthalocyanine, 1000 parts of calcium chloride and 25 parts of tetrachlorethylene. After 48 hours of grinding, the mass is taken up with hot water, filtered, washed until complete elimination of the salt is obtained and then dried. A beta form pigment composition is obtained which is solid to recrystallization and has no tendency to fluocculate in solvent base printing inks.

EXAMPLE 10

In a container placed in a shaking apparatus there are thoroughly mixed for 24 hours 5 parts of bis-(4-butoxy phenoxymethyl) copper phthalocyanine and 95 parts of a phthalocyanine pigment made up mostly of epsilon form whose diffraction spectrum under X ray is characterized by the following principal reticular distances: 4.20 — 5.07 — 6.25 — 9.7 and 11.8 A. The mixture obtained is very stable to solvents; this can be verified by applying the boiling xylene test described in Example 3. Examination of the X-ray diffractogram of the product treated with xylene confirms that the crystalline system has not evolved; the same reticular distances as those given previously were found.

The same xylene treatment made on the unstabilized pigment entails the total transformation of this latter into the beta form characterized by the reticular distances: 2.94 — 3.20 — 3.41 — 3.76 — 4.91 — 5.77 — 6.33 — 7.13 — 8.43 — 9.7 and 12.6 A.

EXAMPLE 11

Into 100 parts of water containing 7 parts of potassium hydroxide are introduced 25 parts of N,N-3-diethylamino phenol. When the dissolution is complete, there are added with stirring 100 parts of an aqueous paste of bis-chloromethyl copper phthalocyanine, corresponding to 24.5 parts of dry product. It is heated for 4 hours at 98°C, then filtered, washed and dried. There are obtained 26 parts of a greenish blue compound whose composition corresponds to that of bis-(N,N-3-diethylamino phenoxymethyl) copper phthalocyanine.

There are thoroughly mixed 96 parts of a chlorine-free phthalocyanine pigment with 4 parts of the above compound. The pigment composition obtained is very stable to solvents; this can be verified by applying the test described in Example 3. Further, inks and paints, with a base of solvents colored with this pigment composition do not have a tendency to flocculate and are stable in time.

EXAMPLE 12

When in the preceding example, the bis-(N,N-3-diethylamino phenoxymethyl) copper phthalocyanine is replaced by bis-(N,N-3-diethylamino 4-methyl phenoxymethyl) copper phthalocyanine, there is also obtained a pigment composition which has no tendency to recrystallize and change crystalline form when it is put in contact with aromatic solvents.

Further variations and modifications will be apparent to those skilled in the art from the foregoing.

We claim:

1. A pigment composition consisting of an admixture of a copper phthalocyanine pigment with 1 to 20% of a stabilizing compound of the formula:

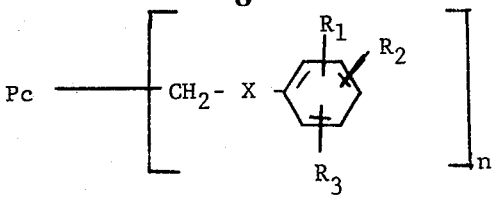

wherein
Pc represents unmetallized or metallized phthalocyanine
X represents oxygen, sulfur or the —NH— bridge,
$R_1$ represents halogen, alkoxy, trifluoromethyl, trifluoromethoxy, cyano, carboxy, nitro, N-alkylamino or N,N-dialkylamino,
$R_2$ represents hydrogen, alkyl or alkoxy,
$R_3$ represents hydrogen or alkyl,
$n$ is a number from 1 to 8,
$R_1$, $R_2$ and $R_3$ being in the ortho, meta or para positions of the benzene ring.

2. A pigment composition according to claim 1 wherein the phthalocyanine pigment is copper phthalocyanine in beta form.

3. A pigment composition according to claim 1 wherein the phthalocyanine pigment is copper phthalocyanine in one of the forms alpha, gamma, delta, epsilon.

4. A pigment composition according to claim 1 containing the stabilizing compound of formula (I) wherein $n$ is equal to 2 or 3.

5. A pigment composition according to claim 1 containing 2 to 10% of the stabilizing compound.

6. A process for the stabilization of copper phthalocyanine pigments which comprises incorporating into a copper phthalocyanine pigment from 1 to 20% of a stabilizing compound as defined in claim 1.

* * * * *